United States Patent [19]

Dragner et al.

[11] Patent Number: 5,354,803
[45] Date of Patent: Oct. 11, 1994

[54] POLYVINYL ALCOHOL GRAFT COPOLYMER NONWOVEN BINDER EMULSION

[75] Inventors: Louis R. Dragner, Rock Hill; William C. Floyd, Chester, both of S.C.

[73] Assignee: Sequa Chemicals, Inc., Chester, S.C.

[21] Appl. No.: 38,021

[22] Filed: Mar. 29, 1993

[51] Int. Cl.$^5$ ............................................. C08L 29/04
[52] U.S. Cl. ................................. 524/503; 524/211; 524/459; 524/493; 524/494; 524/557; 525/58; 525/59
[58] Field of Search ............... 524/459, 211, 503, 493, 524/494; 525/58, 59

[56] References Cited

U.S. PATENT DOCUMENTS

| | | | |
|---|---|---|---|
| 3,094,500 | 6/1963 | Herman et al. | 260/29.6 |
| 3,644,257 | 2/1972 | Nickerson et al. | 260/29.6 |
| 4,043,961 | 8/1977 | Beresniewicz et al. | 260/29.6 |
| 4,118,357 | 10/1978 | Brabetz et al. | 260/29.6 |
| 4,133,791 | 1/1979 | Kemenater et al. | 260/29.6 |
| 4,521,561 | 6/1985 | Hausman et al. | 524/459 |
| 4,605,589 | 8/1986 | Orphanides | 428/290 |
| 4,735,986 | 4/1988 | Iacoviello | 524/427 |
| 4,767,816 | 8/1988 | Iacoviello et al. | 524/459 |
| 4,921,898 | 5/1990 | Lenney et al. | 524/459 |
| 5,075,401 | 12/1991 | Zhang | 525/59 X |
| 5,092,953 | 3/1992 | Derby et al. | 156/331.7 |
| 5,143,966 | 9/1992 | Lee et al. | 524/459 |
| 5,147,908 | 9/1992 | Floyd et al. | 524/49 |
| 5,244,695 | 9/1993 | Davidowich et al. | 427/389.9 |
| 5,248,724 | 9/1993 | Nosaka et al. | 525/58 |

OTHER PUBLICATIONS

Air Products, "Airvol Polyvinyl Alcohol", 1989 (Applications).
DuPont, "Elvanol Polyvinyl Alcohol, Product and Properties Guide", 1990.
Hoechst Corporation, "Mowiol Polyvinyl Alcohol", 1985, pp. G1 thru G4.

*Primary Examiner*—Judy M. Reddick
*Attorney, Agent, or Firm*—Mitchell D. Bittman

[57] ABSTRACT

A surfactantless, formaldehyde-free polyvinyl alcohol graft copolymer binder emulsion for non-woven products is prepared comprising: 12% to 35% of a fully hydrolyzed low or ultra low molecular weight PVOH and 65% to 88% of a vinyl and/or acrylic monomer which is graft copolymerized with the PVOH through emulsion polymerization.

17 Claims, No Drawings

POLYVINYL ALCOHOL GRAFT COPOLYMER NONWOVEN BINDER EMULSION

TECHNICAL FIELD

The present invention relates to a surfactantless non-formaldehyde binder emulsion for nonwoven fabrics comprising polyvinyl alcohol graft copolymers.

BACKGROUND OF THE INVENTION

Polyvinyl alcohol (PVOH) has long been used as a protective colloid for manufacturing polymer emulsions to stabilize such emulsions and the literature teaches that a stabilizing effective amount, e.g. 2% to 10% of the monomer weight, may be PVOH. The surfactancy and the effectiveness as a protective colloid both increase as the residual acetate content increases. These emulsions generally become more hydrophilic with increasing amounts of PVOH, and the films of such emulsions becomes more readily re-emulsifiable. The salt content is also reported to have a similar effect. Generally, the partially hydrolyzed grades of PVOH are used as colloids. Fully hydrolyzed grades are rarely used in this way. It is also taught that PVOH as a colloid may be incorporated at the beginning of the polymerization or added to the finished polymer solution. PVOH stabilized emulsions contain almost exclusively polyvinyl acetate and if other monomers are used, surfactants may be required.

U.S. Pat. No. 4,605,589 discloses a vinylacetate/ethylene copolymer prepared in the presence of a stabilizing amount of ultra low molecular weight PVOH, with a partially hydrolyzed PVOH preferred.

U.S. Pat. No. 3,094,500 discloses adhesives and surface coatings prepared with a vinyl acetate polymer emulsions containing at least 10% of a partially hydrolyzed low molecular weight PVOH and a surfactant.

While these references and other prior art systems disclose various copolymer emulsions prepared in the presence of PVOH they have a variety of drawbacks with respect to developing a nonwoven binder. The use of surfactants is considered to be detrimental to the bound nonwoven product due to its detrimental effect upon water resistance and because surfactants may act as a lubricant at high temperatures and adversely affect elongation resistance.

A number of these systems also are based on the use of N-methylol acrylamide as a crosslinker which release formaldehyde as they cure. The release of formaldehyde is a cause for health, environmental and regulatory concern. Further, these prior art systems generally have used PVOH strictly for its stabilizing effect, while this invention has found that the use of larger amounts of PVOH is effective as part of the crosslinking system.

SUMMARY OF THE INVENTION

Briefly, the present invention prepares a surfactantless, formaldehyde-free polyvinyl alcohol graft copolymer binder emulsion for nonwoven products comprising on a solids basis: 12% to 35% of a fully hydrolyzed low or ultra low molecular weight PVOH and 65% to 88% of a vinyl and/or acrylic monomer which is graft copolymerized with the PVOH through emulsion polymerization.

DETAILED DESCRIPTION OF THE INVENTION

This invention uses maximum quantities of fully-hydrolyzed low and ultra low molecular weight PVOH to produce a surfactantless acrylic and/or vinyl latex that is crosslinkable by a non-formaldehyde crosslinking agent. Unlike conventional colloid-protected lattices which use a small amount of colloid for stabilization, this invention uses a large amount of colloid as part of the crosslinking system. This latex system may be crosslinked under normal cure temperatures to afford a highly water-resistant, surfactantless, formaldehyde-free, high strength binder suitable for high-temperature applications including roofing mat or filter media. The level of PVOH in the copolymer is about 12% to 35% by weight of the solids, preferably 17% to 25%, to achieve the high tensile strength in the bound nonwoven product and to minimize elongation. The internal hydrogen bonding in the PVOH also contributes to the crosslinking.

Not all grades of PVOH are suitable. Those grades having a molecular weight classification of medium or high are not suitable as they impart excessive viscosities and while low molecular weight can be used, the ultra-low molecular weight PVOH is preferred in obtaining a fluid binder emulsion at high solids (e.g. 30%–40%). The low molecular weight PVOH is defined as having a viscosity of up to 10 centipoise in a 4% aqueous solution at 20° C. and the ultra-low molecular weight PVOH as having a viscosity of up to 5 centipoise in a 4% aqueous solution at 20° C.

Fully hydrolyzed grades of PVOH, i.e. at least 98 mole % hydrolyzed, preferably at least 99.4 mole % hydrolyzed, are utilized as they provide great binder strength (i.e. tensile strength) to the nonwoven product. Generally at least about 75% preferably at least 85% of the PVOH in the copolymer is fully hydrolyzed. It has been found that adding up to about 25% preferably up to 15% of partially hydrolyzed PVOH is advantageous in that it provides additional stability to the binder emulsion. By partially hydrolyzed is meant that the PVOH is 70 mole % to 97 mole % hydrolyzed.

The vinyl and/or acrylic monomers are present in the polyvinyl alcohol graft copolymer in an amount of from 65% to 88%, preferably 75% to 83% by weight of the total solids. These monomers are chosen to provide a Tg suitable for the desired application as well as solvent resistance or receptivity as required for a particular application.

Suitable monomers include, but are not limited to $C_1$–$C_8$ acrylate esters and methacrylate esters, such as ethyl acrylate, methyl acrylate, butyl acrylate, propyl acrylate, 2-ethylhexyl acrylate, ethyl methacrylate, vinyl acetate, styrene, methyl methacrylate, hydroxy ethyl acrylate, hydroxy propyl acrylate and mixtures thereof. Other common monomers which may be present include $C_3$–$C_{10}$ alkenoic acid, such as acrylic acid, methacrylic acid and crotonic acid and maleic acid, acrylamide, monoethyl maleate and up to 5% of multifunctional monomers such as divinyl benzene, pentaerythritol triacrylate, triallyl cyanurate, bis-phenol-A diepoxydiacrylate and the like.

In general, suitable copolymer emulsions can be prepared by the copolymerization of the vinyl and/or acrylic monomers in the presence of the polyvinyl alcohol in an aqueous medium and in the presence of a redox system. Generally, a temperature within the range of about 40° to 99° C. is maintained during the polymerization reaction and the reaction system is maintained by suitable buffering agents at a pH of 2 to 6.

Various free-radical forming sources can be used in carrying out the polymerization of the monomers, such as peroxide compounds. Combination-type systems employing both reducing agents and oxidizing agents can also be used, i.e. a redox system. Suitable reducing agents, or activators, include bisulfites, sulfoxylates, alkali metal bisulfite-ketone adducts, or other compounds having reducing properties such as ascorbic acid, erythorbic acid and other reducing sugars. The oxidizing agents include hydrogen peroxide, organic peroxides such as t-butyl hydroperoxide and the like, persulfates, such as ammonium or potassium persulfate, and the like. Specific redox systems which can be used include hydrogen peroxide and erythorbic acid; hydrogen peroxide, ammonium persulfate or potassium persulfate with sodium metabisulfite, sodium bisulfite or ferrous sulfate; t-butyl hydroperoxide with sodium bisulfite-acetone adduct. Other free radical forming systems that are well known in the art can also be used to polymerize the monomers. Persulfates are preferred in that they seem to provide a higher grafting efficiency.

The oxidizing agent is generally employed in an amount of 0.01% to 4%, preferably 0.05% to 0.5% based on the weight of the monomers introduced into the polymerization system. The reducing agent is ordinarily added in the necessary equivalent amount.

The crosslinking system employed in this invention is also novel for this type of nonwoven binder. The most common crosslinking monomer used in the art is N-methylol acrylamide (NMA). However, the NMA-based systems also release formaldehyde as they cure which is a cause of health, environmental and regulatory concern. Other crosslinking systems are known, but also seem to depend on one minor component reacting with another minor component. In this invention, a minor amount of crosslinker additive reacts with a major component, i.e., the grafted PVOH colloid, to effect the crosslinking reaction. This is inherently a more efficient process. Suitable crosslinking reagents include, colloidal silica; salts or chelates of transition metals such as titanium or zirconium chelates; and a glyoxal compound such as a blocked glyoxal resin. The glyoxal compound includes glyoxal or a blocked glyoxal resin as described in U.S. Pat. No. 4,695,606 wherein the glyoxal is blocked by reaction with a blocking component (e.g. urea) to inhibit it from reacting with other components prior to drying. The crosslinking agent may be added at about 0.01% to 20%, preferably 0.5% to 10%, by weight of the PVOH. The nonwoven products prepared have been found to provide equal or better tensile strength and elongation resistance when compared to commercial acrylic lattices crosslinked using formaldehyde based N-methylol acrylamide technology. Uniquely, crosslinking may be effected without additional crosslinking agents because of crosslinking due to the hydrogen bonding effects of the hydroxyls of the PVOH.

Copolymer binder emulsions can be produced having a high solids content of 28% to 40%. Any thickening upon standing which does occur is reversible upon heating or applying shear by means of shaking or vigorous agitation. This thickening may be ameliorated by incorporation of a viscosity modifying agent such as urea. It was unexpectedly found that incorporation of a few percent (e.g. 5 to 15%) of a partially hydrolyzed ultra low molecular weight PVOH also stabilized the viscosity without loss of physical properties or imparting excessive viscosity. Viscosity may also be influenced by use of an initial catalyst. Generally the copolymer binder emulsion has a viscosity of below 1000 centipoise, preferably below 500 centipoise when measured at 30% aqueous solution at 20° C.

The copolymer binder emulsion of the invention can be used to prepare nonwoven products, or fabrics, by a variety of methods known in the art which, in general, involve the impregnation of a loosely assembled mass of fibers with the binder latex, followed by a moderate heating to dry the mass. The fibers may comprise nature fiber such as cellulose, wool, jute; artificial fibers such as cellulose acetate; synthetic fibers such as polyamides, nylon, polyesters, acrylics, polyolefins, ceramics, glass fibers, i.e. polyethylene, polyvinyl chloride, polyurethane, and the like, alone or in combination with one another.

The amount of binder, calculated on a dry basis, applied to the fibrous starting web is that amount which is at least sufficient to bind the fibers together to form a self-sustaining web and suitably ranges from about 3 to about 100% or more by weight of the starting web, preferably from about 10 to about 50 wt % of the starting web. The impregnated web is then dried and cured. The fabrics are suitably dried by passing them through an air oven or the like and then through a curing oven. Typical conditions to achieve optimal crosslinking are sufficient time and temperature such as drying at 150°–200° F. (66°–93° C.) for 4–6 minutes, following by curing at 300°–310° F. (149°–154° C.) for 3–5 minutes more. However, other time-temperature relationships can be employed as is well known in the art, shorter time and higher temperature or longer times at lower temperatures being used.

The nonwoven products prepared by this invention have been found useful in applications requiring high temperature resistance, tensile strength and elongation resistance such as binders for roofing mat, filter media, fiberglass and insulation. The following examples serve to illustrate the present invention.

EXAMPLE I

The following is a procedure typically employed in preparing the non-woven binder of this invention. To a 4 liter resin kettle is charged 2440.3 g of deionized water. The kettle is equipped with a mechanical stirrer, a 4-holed lid, nitrogen sparge, temperature probe, condenser, monomer inlet and catalyst inlet using suitable adapters. The ambient water is agitated and 319.3 g of fully hydrolyzed, ultra low molecular weight PVOH (Airvol 103, by Air Products Corporation, 98% hydrolyzed and 4 centipoise in a 4% aqueous solution at 20° C.) is slowly added. A slow nitrogen sparge is started and the contents heated to 90° C. for 30 minutes to solubilize the PVOH. While the batch is heating, the monomer and catalyst mixes are prepared. The monomer charge consisted of ethyl acrylate (569 g), methyl methacrylate (371.1 g), n-butyl acrylate (10.6 g), and bis-phenol-A-diepoxy diacrylate (4.4 g, Ebercryl 3700 by UCB Radcure, Inc.). This was a neat monomer mix, not an emulsion. The catalyst solution consisted of deionized water (192.6 g), potassium persulfate (4.8 g), and 20% ammonium hydroxide (0.9 g).

After cooking out the PVOH, the batch was cooled to 80° C. The monomers and catalyst were added simultaneously by pump over a 3 hours period. A finishing catalyst of deionized water (70.7 g), and potassium persulfate (3.5 g), was then added and held at 80° C. for 1 hour. The batch was cooled to 35° C. and pH adjusted to 7.2 with 12.6 g of 10% ammonium hydroxide. A biocide (Kathon LX, by Rohm & Haas Corporation) 0.2 g was also added. A white latex was obtained having 29% solids and a viscosity of 90 cps (Brookfield viscosity, #3 spindle, 100 rpm). The solid portion was a graft copolymer containing 25% PVOH and 75% acrylic polymer.

EXAMPLE II

A batch was prepared as in Example I in which a partially hydrolyzed, ultra low molecular weight PVOH (Airvol 203, by Air Products Corporation 88% hydrolyzed and 4 centipoise in 4% aqueous solution at 20° C.) was used in place of the Airvol 103 in Example I. The resulting product was an almost translucent white latex having solids of 28% and a viscosity of 3100 cps (#3 spindle, 20 rpm). This demonstrates the effect that degree of hydrolysis of the PVOH has on the viscosity of the product. A low viscosity is desirable in that it is more readily handled.

EXAMPLE III

A batch was prepared as in Example I in which the PVOH charge consisted of 83% fully hydrolyzed ultra low molecular weight PVOH (98% hydrolyzed and 4 cps) and 17% partially hydrolyzed ultra low molecular weight PVOH (88% hydrolyzed and 4 cps). The resulting product had solids of 28% and a viscosity of 95 cps (#3 spindle, 100 rpm). After a week at ambient temperature, the product of Example I had thickened to a soft reversible gel. The product of Example II was still approximately 3000 cps. The viscosity of the product of Example III was 200 cps. This stabilization of viscosity was unexpected and appears to be a synergistic effect of the two PVOH types.

EXAMPLE IV

A product was prepared as in Example I except that the ratio of acrylic polymer to the PVOH (Arivol 103) was 5 to 1. The 5:1 product exhibited a viscosity of 80 cps at 31% solids.

EXAMPLE V

The products of Examples I and IV, Sequabond 129 (a pre-crosslinked vinyl acetate copolymer, by Sequa Chemicals, Inc.) and Paranol 781 (an acrylic copolymer, by Parachem) were applied to nonwoven polyester roofing mat. The products of Examples I and IV had 1% by weight ammonium titanium lactate (based on TiO$_2$ content) added as a crosslinking agent. The other two products contained N-methylol acrylamide as a comonomer for crosslinking during the cure. The binders were applied to give approximately 21% add-on, and cured for 5 minutes at 177° C. Samples were tested for ambient tensile strength in both machine and cross direction, % stretch at 180° C. under a load of 5 and 8 Kg and wicking. Tensile and stretch testing were done on an Instron Model 1100 Tensile Tester using 1×4 inch or 2×6 inch mat strips, respectively. Wicking was tested by suspending a strip of mat vertically in an aqueous solution containing blue dye and noting if the dye migrated upward on the strip. The following results were obtained:

TABLE I

| | Product | | | |
|---|---|---|---|---|
| | 129 | EX. I | EX. IV | 781 |
| MD Tensile, kg | 27.3 | 30.7 | 31.3 | 30.0 |
| CD Tensile, kg | 19.6 | 21.3 | 19.6 | 19.7 |
| % Stretch, | | | | |
| 5 kg | 5.5 | 4.3 | 4.8 | 4.9 |
| 8 kg | 14.9 | 10.2 | 14.5 | 12.9 |
| Wicking | Fail | Pass | Pass | Pass |

These results show that both the 3:1 and 5:1 polymer:PVOH graft products exhibit machine and cross-directional tensile strength equivalent to or better than the conventional NMA containing commercial products. The PVOH graft products exhibited less stretch at high temperature than the commercial products. In spite of having high levels of PVOH, the products of Examples I and IV show excellent resistance to wicking. This excellent performance is attained without the use of formaldehyde in the products.

EXAMPLE VI

The product of Example I was mixed with a small-particle sized colloidal silica (Klebosol 1343NA, from Hoechst) in a 96 to 4 ratio (polymer to silica). This was compared with Sequabond 129 as in Example V. Both products were applied to polyester mat, then cured and tested as before. The following results were obtained:

TABLE II

| | Product | |
|---|---|---|
| | EX. I/Silica | 129 |
| MD Tensile, kg | 29.5 | 25.4 |
| CD Tensile, kg | 19.5 | 18.3 |
| % Stretch, | | |
| 5 kg | 3.5 | 5.0 |
| 8 kg | 8.2 | 13.7 |

These results show that colloidal silica functions as an effective crosslinking agent in this system. The silica provides even more resistance to stretch than the titanium chelate, while affording comparable tensile strength.

EXAMPLE VII

A product using the same formulation as that in Example I was prepared except that half of the delay catalyst was added as an initial catalyst. No initial monomer was used. This product exhibited more stable viscosity over time than the product of Example I. Over a two week period, the viscosity increase of this product was about half that of the product of Example I.

EXAMPLE VIII

To a 2 liter resin kettle was added 1110 g of the product of Example VII (27% solids), and 20 g of Kelbosol 1343NA (a 30% active, small particle size colloidal silica from Hoechst). The pH was adjusted to 9.0 with 25% sodium hydroxide. The batch was heated to 65°–70° C. for one hour then cooled to 35° C. The pH had dropped to 7.3, and was adjusted to 8.7 with 25% sodium hydroxide. This pH drop is indicative of a reaction between the PVOH and the colloidal silica. This product contained 2% colloidal silica based on total solids, and was Sample #2 in Example IX. Sample #1 was prepared as above, but using 10 g of colloidal silica with 1110 g of PVOH graft instead of 20 g of colloidal silica, to provide a PVOH graft containing 1% colloidal silica reacted in the product.

EXAMPLE IX

A series of samples was prepared for use as a binder of polyester roofing mat on a pilot scale machine. Samples were diluted to 17% solids to prepare the pad bath solutions. The needle-punched polyester mat passed through the pad bath solution, becoming saturated, and through squeeze rolls, and finally through the oven for curing. Sample #1 was comprised of the product of Example VII with 1% colloidal silica (on solids basis) reacted into the product as in Example VIII. Sample #2 was similar to Sample #1, except it contained 2% colloidal silica reacted in. Sample #3 consisted of the product of Example VII with 2% colloidal silica mixed in (not reacted in) one day prior. Sample #4 consisted of the product of Example VII with 1% colloidal silica stirred in prior to pad bath preparation. Sample #5 consisted of 4% colloidal silica stirred in (not reacted in) prior to pad bath preparation. Sample #6 consisted of the product of Example VII with no colloidal silica added. Sample #7 was a commercial styrene-acrylic latex (Paranol 203, by Parachem, Inc.) made with N-methylol acrylamide as the crosslinking agent which is used commercially as a binder for polyester roofing mat. All samples achieved approximately 31% add-on. None exhibited any tendency toward wicking as tested by suspending a test strip vertically in an aqueous solution of blue dye. Samples were tested on an Instron Model 1100 tensile tester for machine direction (MD) tensile, cross direction (CD) tensile and percent stretch at 180° C. under loads of 5 kg and 8 kg. Results are shown below.

TABLE III

| | Sample # | | | | | | |
|---|---|---|---|---|---|---|---|
| | 1 | 2 | 3 | 4 | 5 | 6 | 7 |
| MD Tensile, kg | 35.3 | 35.0 | 33.4 | 33.0 | 33.9 | 32.5 | 29.5 |
| CD Tensile, kg | 27.8 | 26.6 | 25.8 | 25.8 | 25.0 | 25.4 | 19.2 |
| % Stretch, 180° C., | | | | | | | |
| 5 kg | 5.1 | 4.6 | 5.0 | 5.2 | 5.4 | 5.3 | 5.8 |
| 8 kg | 9.7 | 9.1 | 10.0 | 10.4 | 10.8 | 10.5 | 12.1 |

These results show that the PVOH graft containing 33% PVOH by weight of the monomer is significantly stronger than a conventional acrylic polymer. The unreacted addition of colloidal silica at various levels has little effect on the properties of the PVOH graft. However, when the colloidal silica is reacted into the PVOH graft, the properties are further enhanced. However, 2% reacted in does not appear to offer more improvement over 1% reacted in.

EXAMPLE X

The formulation of Example II having a 3:1 monomer: PVOH ratio, using ultra low molecular weight partially hydrolyzed PVOH was repeated at 30% solids instead of 28% using the same procedure. Throughout the run, the product was translucent as was the product of Example II. However, shortly after the delays had finished, the batch suddenly set up as a lumpy paste. This material was processed with a hand-homogenizer to afford a thick smooth cream. A similar batch having a 7:1 monomer: PVOH ratio also set up as the delays ended. This was also homogenized. These served as Samples E and F in Example XI. This shows an unexpected advantage of using fully hydrolyzed PVOH in place of the partially hydrolyzed PVOH generally preferred in prior art. With the acrylic monomers, fully hydrolyzed PVOH used at there levels affords a fluid latex. Substituting partially hydrolyzed PVOH into the same formula produces an unstable product.

EXAMPLE XI

A series of PVOH grafts without any crosslinking agent was made to examine the effect of the ratio of monomer to PVOH and to compare fully hydrolyzed to partially hydrolyzed PVOH. The same monomer composition was used for each example. The procedure and monomer composition used for these examples are similar to that described in Example I. The only difference is in the amount and type of PVOH. Initial water charge was adjusted to achieve final solids of 30%. In the fully hydrolyzed examples, the monomer: PVOH ratio ranged from 3:1 to 9:1. The monomer: PVOH ratios in the partially hydrolyzed examples were 3:1 and 7:1. Both of the lattices containing partially hydrolyzed PVOH coagulated near the end of the delay. The pasty coagulum was homogenized to afford a thick, creamy product suitable for padding upon dilution. The other products did not need homogenizing. These lattices were applied to nonwoven polyester mat achieving approximately 22% add-on and cured 3 minutes at 350° F. Cured mat was tested for tensile strength (MD and CD), Hot Wet Tensile (MD, immersed 10 minutes at 82° C. in water) and percent elongation under 5 kg and 8 kg loads at 180° C. Results are shown below:

TABLE IV

| | Sample | | | | | |
|---|---|---|---|---|---|---|
| | A | B | C | D | E | F |
| Monomer: PVOH | 3:1 | 5:1 | 7:1 | 9:1 | 3:1 | 7:1 |
| Hydrolysis | 98+ | 98+ | 98+ | 98+ | 89 | 89 |
| RT Tensile, kg | | | | | | |
| (MD) | 30.12 | 26.52 | 30.25 | 28.44 | 27.36 | 27.36 |
| (CD) | 24.83 | 23.81 | 23.60 | 23.15 | 23.89 | 20.64 |
| Hot Wet Tensile, kg (MD) | 27.24 | 27.32 | 26.18 | 25.03 | 21.61 | 22.55 |
| % Stretch, 180° C., | | | | | | |
| 5 kg | 4.39 | 4.89 | 5.78 | 7.13 | 10.1 | 16.5 |
| 8 kg | 9.73 | 12.13 | 21.4 | 24.4 | 29.6 | 32.1 |

The room temperature MD tensiles do not show substantial difference due to any of the experimental variables. The CD tensile show a slight trend favoring the lower monomer: PVOH ratios. The partially hydrolyzed PVOH samples (E and F) are clearly inferior in tensile to the fully hydrolyzed counter parts. The Hot Wet Tensile highlights the water sensitivity of the partially hydrolyzed PVOH grafts. The high temperature stretch test shows there is little difference between a 3:1 and 5:1 graft on fully hydrolyzed PVOH, but performance starts to deteriorate at a 7:1 ratio due to less hydrogen bonding. The partially hydrolyzed grafts are clearly inferior to the corresponding fully hydrolyzed grafts, having little resistance to high temperature elongation. This example also demonstrates the effectiveness of the PVOH crosslinking due to the hydrogen bonding effects of the hydroxyls of the PVOH.

EXAMPLE XII

The PVOH graft of Example VIII containing the reacted colloidal silica (1%) was padded onto polyester mat at 22, 20, 18 and 15% add-on, and cured as before. A pre-crosslinked vinyl-acrylic latex (Sequabond 129 by Sequa Chemicals, Inc.) used commercially as a polyester mat binder was padded on at 22% add-on as a control. The mat samples were tested for tensile and elongation as before. Results are shown in Table V. These data show that the PVOH graft at 18% add-on is superior to the commercial product at 22% add-on. At 16% add-on, the PVOH graft still has clearly superior tensile strength, but only comparable stretch resistance at high temperature.

TABLE V

|  | Sample | | | | |
| --- | --- | --- | --- | --- | --- |
|  | A | B | C | D | E |
| Type | Ex. 8 | Ex. 8 | Ex. 8 | Ex. 8 | Control |
| Add-on, % | 22 | 20 | 18 | 16 | 22 |
| % Stretch, 180° C. | | | | | |
| 5 kg | 3.84 | 3.24 | 3.75 | 4.88 | 4.45 |
| 8 kg | 9.61 | 8.92 | 9.81 | 13.42 | 12.67 |
| MD tensile, kg | 31.79 | 28.52 | 27.74 | 27.91 | 23.06 |
| CD tensile, kg | 22.87 | 23.33 | 23.25 | 21.57 | 18.76 |

What is claimed is:

1. A surfactantless formaldehyde-free aqueous polyvinyl alcohol graft copolymer binder emulsion for nonwoven products comprising:
   about 12% to 35% of a polyvinyl alcohol based on the weight of solids, wherein the polyvinyl alcohol has a low molecular weight defined as a viscosity up to 10 centipoise when in a 4% aqueous solution at 20° C. and wherein at least 75% of the polyvinyl alcohol is at least 98 mole % hydrolyzed; and
   about 65% to 88% by weight of a monomer selected from the group consisting of vinyl monomer, acrylic monomer and mixtures thereof based on the weight of solids, which is graft copolymerized with the polyvinyl alcohol through emulsion polymerization.

2. Binder of claim 1 further comprising a non-formaldehyde crosslinking agent.

3. Binder of claim 2 wherein the polyvinyl alcohol has a ultra-low molecular weight defined as a viscosity up to 5 centipoise when in a 4% aqueous solution at 20° C.

4. Binder of claim 3 wherein the polyvinyl alcohol is at least 99.4mole % hydrolyzed.

5. Binder of claim 4 wherein up to about 25% of the polyvinyl alcohol is 70mole % to 97mole % hydrolyzed.

6. Binder of claim 3 wherein the monomer is selected from the group consisting of $C_1$–$C_8$ acrylate ester, $C_1$–$C_8$ methacrylate ester, vinyl acetate, styrene, acrylamide, alkenoic acid and mixtures thereof.

7. Binder of claim 3 wherein the crosslinking agent is selected from the group consisting of glyoxal compound, colloidal silica, transition metal salt and transition metal chelate.

8. Binder of claim 7 further comprising a viscosity modifying agent.

9. Binder of claim 8 wherein the viscosity modifying agent is urea.

10. Binder of claim 3 wherein the monomer is selected from the group consisting of ethyl acrylate, methyl acrylate, butyl acrylate, propyl acrylate, 2-ethylhexyl acrylate, ethyl methacrylate, methyl methacrylate, hydroxy ethyl acrylate, hydroxy propyl acrylate, vinyl acetate, styrene, acrylamide, alkenoic acid and mixtures thereof.

11. Binder of claim 3 wherein the emulsion comprises 17% to 25% by weight of the polyvinyl alcohol and 75% to 83% by weight of the monomer, based on the weight of solids.

12. Binder of claim 11 wherein up to about 15% of the polyvinyl alcohol is 70 mole % to 97 mole %.

13. Binder of claim 2 comprising 0.01% to 20% by weight of the crosslinking agent based on the weight of the polyvinyl alcohol.

14. Binder of claim 13 comprising 0.5% of 10% by weight of the crosslinking agent based on the weight of the polyvinyl alcohol.

15. Binder of claim 14 wherein the emulsion has a viscosity of below 1000 cps when measured at 30% aqueous solution at 20° C.

16. Binder of claim 6 further comprising up to 5% by weight of the monomers of a multifunctional monomer.

17. Binder of claim 7 wherein the crosslinking agent is reacted with the polyvinyl alcohol graft copolymer.

* * * * *